(12) United States Patent
Younggren et al.

(10) Patent No.: US 6,743,129 B1
(45) Date of Patent: Jun. 1, 2004

(54) CLUTCH WITH NO RELATIVE ROTATION (75) Inventors: Bruce H. Younggren, Bemidji, MN (US); Brian G. Eck, Bemidji, MN (US); Shane Okeson, Mahnomen, MN (US); Michael Gunderson, Bemidji, MN (US)

(73) Assignee: TEAM Industries, Inc., Bagley, MN (US)

( * ) Notice: Subject to any disclaimer, the term of this patent is extended or adjusted under 35 U.S.C. 154(b) by 0 days.

(21) Appl. No.: 09/723,963

(22) Filed: Nov. 28, 2000

Related U.S. Application Data
(60) Provisional application No. 60/167,765, filed on Nov. 29, 1999.

(51) Int. Cl.[7] ............................................. F16H 59/00
(52) U.S. Cl. ............................................. 474/19; 474/17
(58) Field of Search .................... 474/17, 18, 19, 474/20, 21, 37, 46

(56) References Cited

U.S. PATENT DOCUMENTS

| | | | |
|---|---|---|---|
| 3,195,364 A | 7/1965 | Pauli | 74/230.17 |
| 3,916,707 A | 11/1975 | Wells | 74/230.17 |
| 3,939,720 A | 2/1976 | Aaen et al. | 74/230.17 |
| 3,996,811 A | 12/1976 | Reese | 74/230.17 |
| 4,523,917 A | 6/1985 | Schildt | 474/19 |
| 4,585,429 A | 4/1986 | Marier | 474/12 |
| 5,254,041 A * | 10/1993 | Duclo | 474/14 |
| 5,326,330 A | 7/1994 | Bostelmann | 474/13 |
| 5,421,784 A | 6/1995 | Robert | 474/13 |
| 5,460,575 A | 10/1995 | Berto | 474/11 |
| 5,516,333 A | 5/1996 | Benson | 474/19 |
| 5,562,555 A | 10/1996 | Peterson | 474/14 |
| 5,580,324 A | 12/1996 | Landry | 474/19 |
| 5,720,681 A | 2/1998 | Benson | 474/10 |
| 5,967,286 A * | 10/1999 | Hokanson et al. | 192/110 R |
| 6,120,399 A * | 9/2000 | Okenson et al. | 474/14 |
| 6,146,295 A | 11/2000 | Mor et al. | 474/13 |
| 6,149,540 A | 11/2000 | Johnson et al. | 474/14 |

* cited by examiner

Primary Examiner—Thomas R. Hannon
Assistant Examiner—Vicky A. Johnson
(74) Attorney, Agent, or Firm—IPLM Group, P.A.

(57) ABSTRACT

A driven element (100) has a first sheave (13) and a second moveable sheave (9). The sheaves (9 and 13) are rotatably tied together so that there is no relative motion between the two sheaves (9 and 13).

14 Claims, 9 Drawing Sheets

CLUTCH WITH NO RELATIVE ROTATION

This application claims the benefit of provisional application Ser. No. 60/167,765 filed Nov. 29, 1999.

BACKGROUND OF THE INVENTION

1. Field of the Invention

This invention relates generally to a clutch and particularly to a clutch with no relative rotational movement between the sheaves.

2. Description of the Prior Art

In a driven clutch, there are two sheaves. The first is called a stationary sheave because it is locked rigidly to the post. The other sheave is called moveable because it translates along the cam profile of a cam. The cam profile is for torque sensing. As the moveable sheave moves along the cam, the moveable sheave rotates about the post and slides linearly closer to or further away from the stationary sheave due to the cam angle. This continuously variable transmission delivers torque by squeezing a belt tight enough to prevent slipping. The cam angle allows the continuously variable transmission to be torque sensing. The more torque that is put into the continuously variable transmission, the tighter the continuously variable transmission squeezes the belt. This will shift the continuously variable transmission into a lower ratio. Likewise, when the torque drops, the continuously variable transmission exerts less belt squeeze because of the reaction force in the cam allows the continuously variable transmission to shift into a higher ratio. This feature gives continuously variable transmissions of this type their torque sensing capabilities. In the prior art, the continuously variable transmissions with the two sheaves separate, the torque going through the cam is half the torque through the secondary clutch. The other half goes directly through the stationary sheave into the post that is fixed to it. To change ratios, the movable sheave, which typically has a 13 to 16 degree angle on the sheave face, rotates about the post on the cam, moving away from the stationary sheave, changing the pitch diameter of the belt, thereby changing the ratio of the continuously variable transmission. In the prior art, the moveable sheave follows the cam profile, which causes relative rotational motion between the moveable and stationary sheaves. This in turn causes undesirable friction between the faces of the belt and the stationary and moveable sheaves. This friction loss is called belt smear. This smearing is detrimental to belt life and is a performance and efficiency loss. Current systems squeeze the belt with between 300 to 1,000 pounds. When this much force is present, energy is wasted in smearing the belt.

The present invention addresses the problems associated with the prior art continuously variable transmissions and provides for a driven clutch with no relative rotation between the two sheaves.

SUMMARY OF THE INVENTION

The present invention is a torque-sensing clutch including a post. A first sheave is operatively connected to the post. The first sheave is rotatable on the post and is stationary relative to longitudinal movement on the post. A second sheave is longitudinally moveable and rotatable on the post. A first connector operatively connects the post to the second sheave for rotating the second sheave and for moving the second sheave longitudinally on the post. A second connector operatively connects the first and second sheaves, wherein the first and second sheaves rotate together and reduce belt smear.

In a second embodiment, the present invention is a continuous variable transmission driven element for mounting on a rotatable shaft. The driven element is adapted for use in a belt-type continuous variable transmission operatively connected by an endless belt to a drive element. The driven element includes a post adapted and configured to be operatively connected to a rotatable shaft. A housing is operatively connected to the post, the housing rotatable on the post and being stationary relative to longitudinal movement on the post. A first conical-faced belt contacting coaxially mounted sheave portion is operatively connected to the housing. A second conical-faced belt contacting coaxially mounted sheave portion is longitudinally moveable on the post and is rotatable on the post. A connector is operatively connecting the first and second sheave portions, wherein rotation of the second sheave portion causes rotation of the first sheave portion and reduces belt smear. A cam, having a cam surface, is operatively connected to the second sheave portion. A spider is operatively connected to the post, the spider having a sliding member which is positioned on the cam surface, wherein rotation of the cam on the spider moves the second sheave portion longitudinally and rotationally on the post. A compression spring is positioned between the spider and second sheave portion.

In a third embodiment, the invention is a continuous variable transmission driven element for mounting on a rotatable shaft. The driven element is adapted for use in a belt-type continuous variable transmission operatively connected by an endless belt to a drive element. The driven element includes a post adapted and configured to be operatively connected to a rotatable shaft. A housing is operatively connected to the post, the housing rotatable on the post and being stationary relative to longitudinal movement on the post. A first conical-faced belt contacting coaxially mounted sheave portion is operatively connected to the housing. A second conical-faced belt contacting coaxially mounted sheave portion is longitudinally moveable on the post and is rotatable on the post. A means for connecting the first and second sheave portions is provided, wherein rotation around the post by both sheave portions is equivalent, thereby reducing the belt smear. The connecting means provide for longitudinal movement of the second sheave portion on the post. A cam, having a cam surface, is operatively connected to the second sheave portion. A spider is operatively connected to the post, the spider having a sliding member which is positioned on the cam surface, wherein rotation of the cam on the spider moves the second sheave portion longitudinally and rotationally on the post. A compression spring is positioned between the spider and second sheave portion.

DETAILED DESCRIPTION OF THE PREFERRED EMBODIMENT

Figure 1:
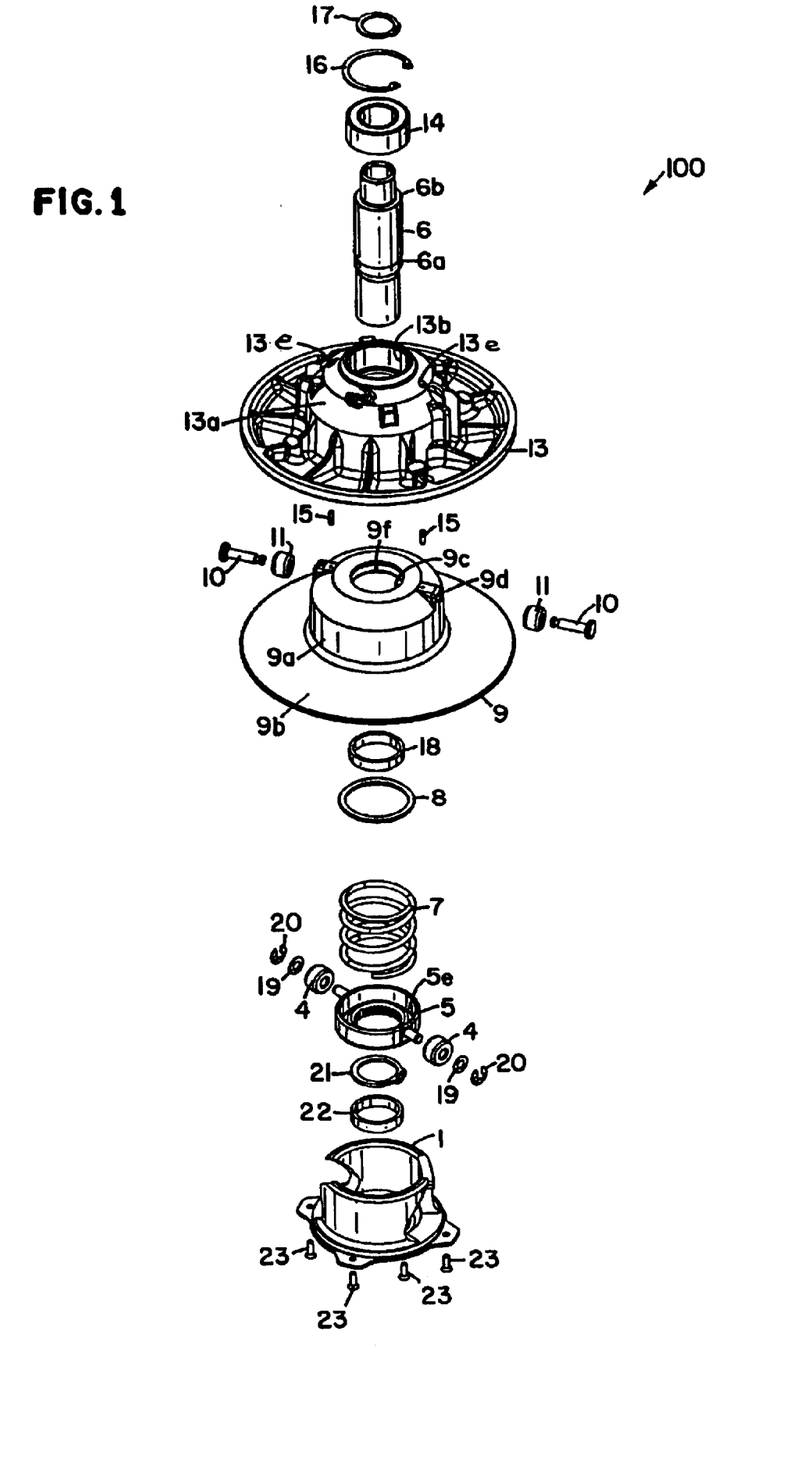
FIG. 1 is an exploded perspective of a driven clutch incorporating the present invention.
Figure 6:
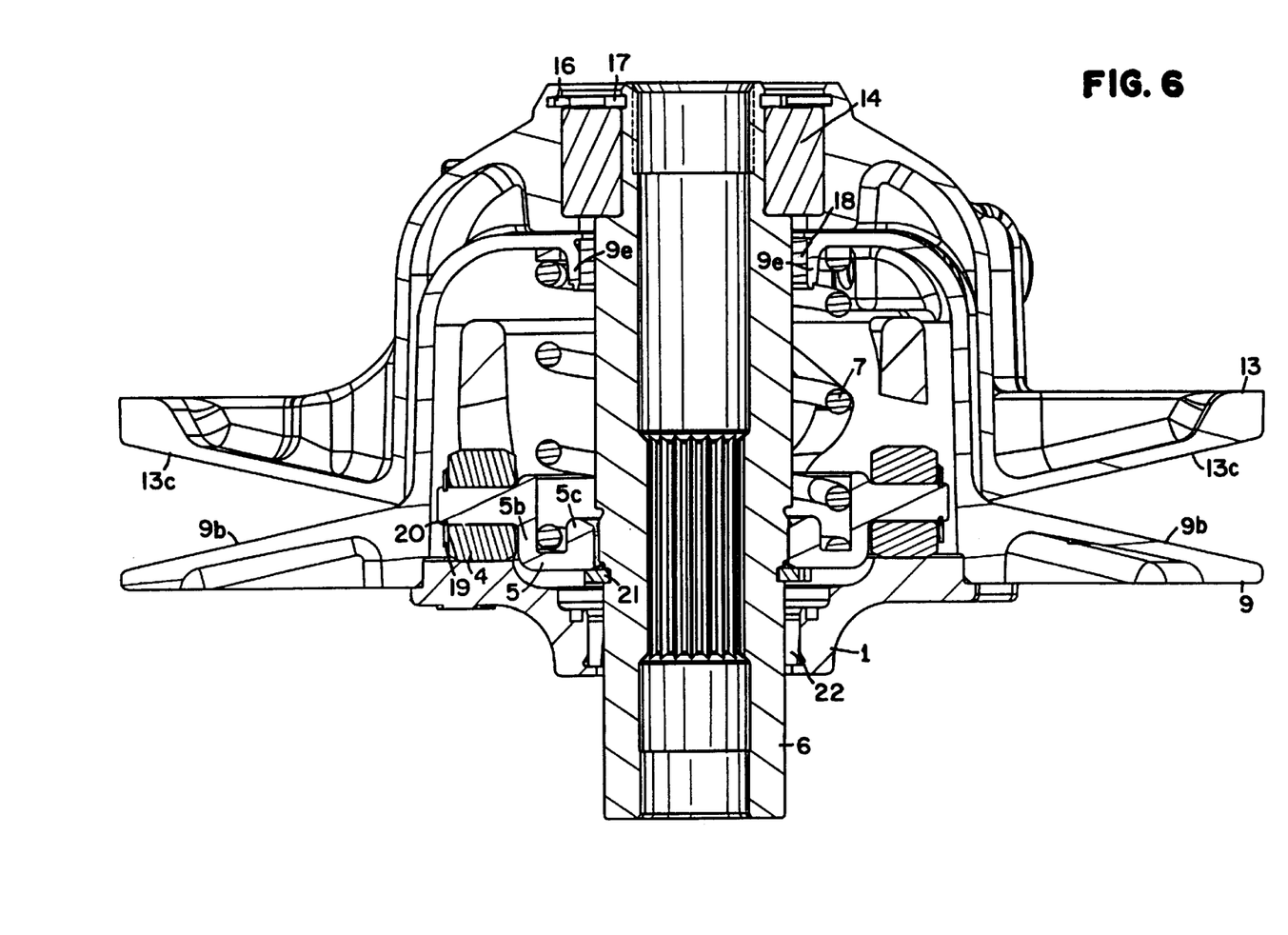
FIG. 6 is a cross-sectional view of the driven clutch shown in FIG. 4 taken generally along the lines 6—6.
Figure 7:
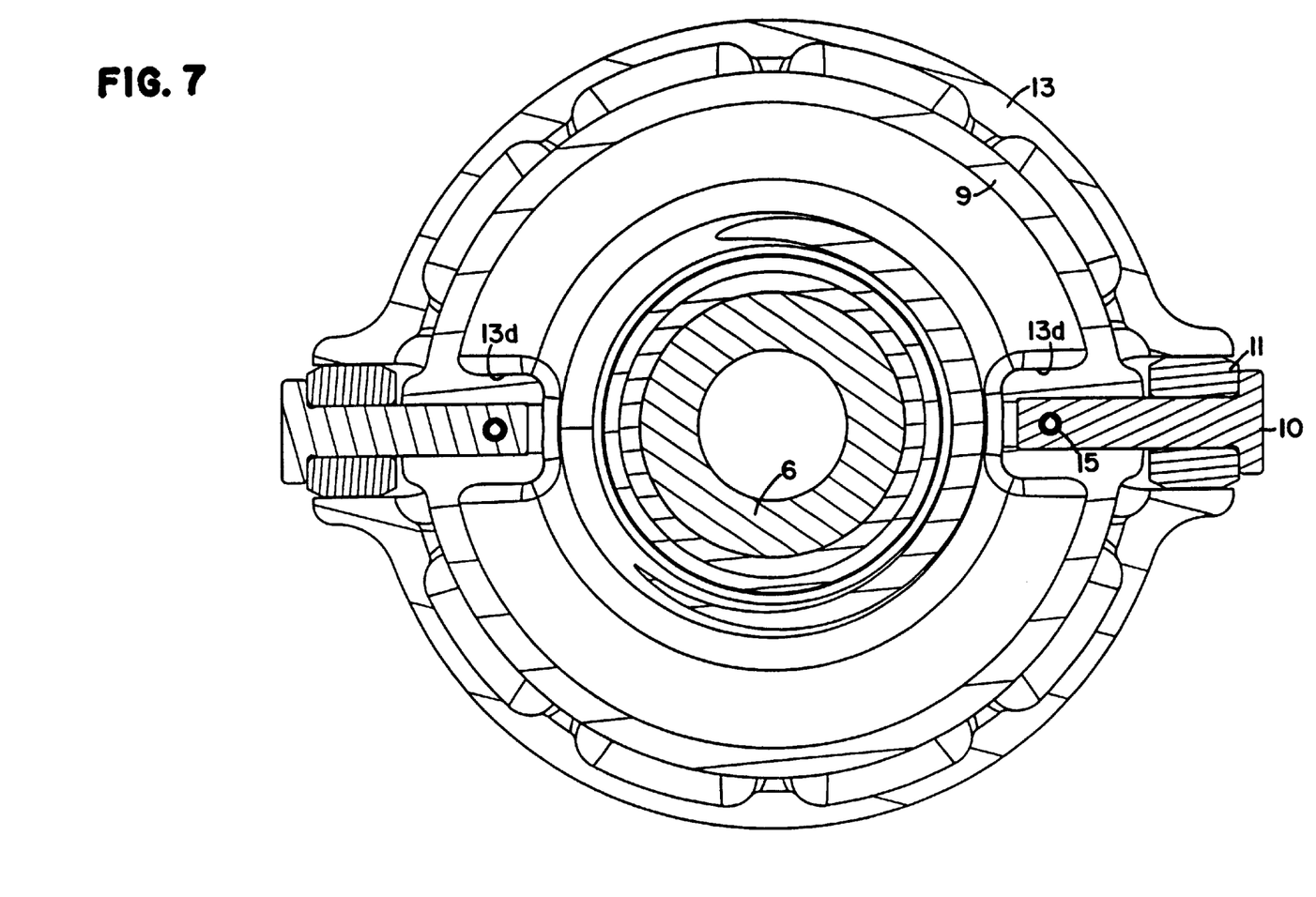
FIG. 7 is a cross-sectional view of the driven clutch in FIG. 5 taken generally along the lines 7—7.
Figure 8:
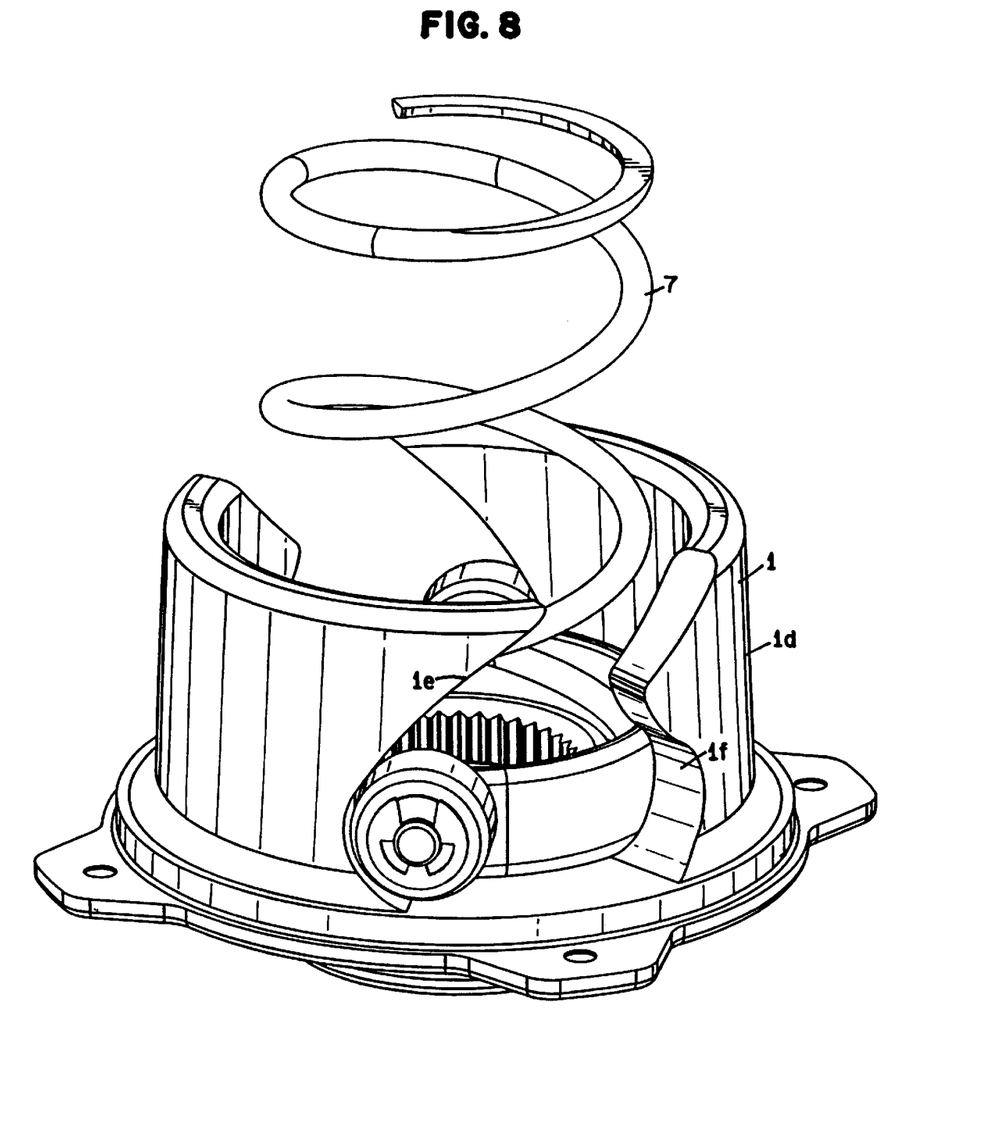
FIG. 8 is an enlarged perspective of the spider in the cam, shown in FIG. 1.

Referring to the drawing, wherein like numerals represent like parts throughout the several views, there is generally designated at 100 a driven clutch. A generally cylindrical post 6 has a plurality of vertical splines 6a formed on its outer surface. The splines 6a encircle the post 6. A shoulder 6b is formed at its top and the post 6 has a smaller diameter at its top end. As seen in FIG. 6, interior vertical splines 6c are formed over a portion of the longitudinal bore. This allows for a connection to a rotatable shaft, such as a transmission shaft. A first sheave 13 has a generally cylindrical housing 13a having an opening 13b formed therein. The sheave 13 also includes a first conical-faced belt contacting coaxially mounted sheave portion 13c which is preferably formed with the housing 13a to form a unitary, one-piece first sheave 13. The housing 13a has two vertical slots 13d formed therein. The slots 13d are spaced 180 degrees from each other. A bearing 14 is positioned in the opening 13b of the housing 13a and the first sheave 13 is coaxially mounted to the post 6 by snap rings 16 and 17. The bearing 14 could, of course, also be a bushing.

Figure 2:
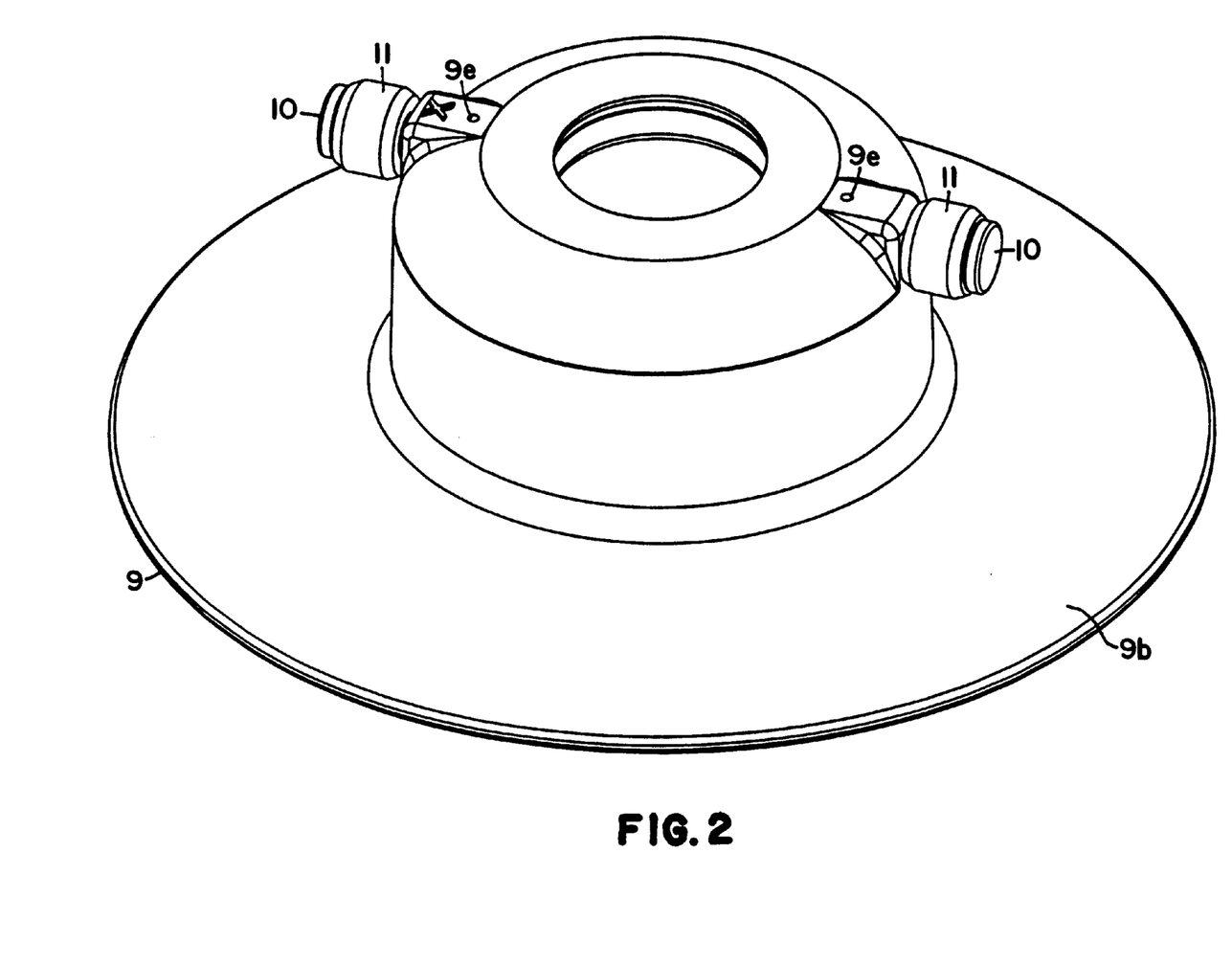
FIG. 2 is a top perspective view of the second sheave, shown in FIG. 1.
Figure 3:
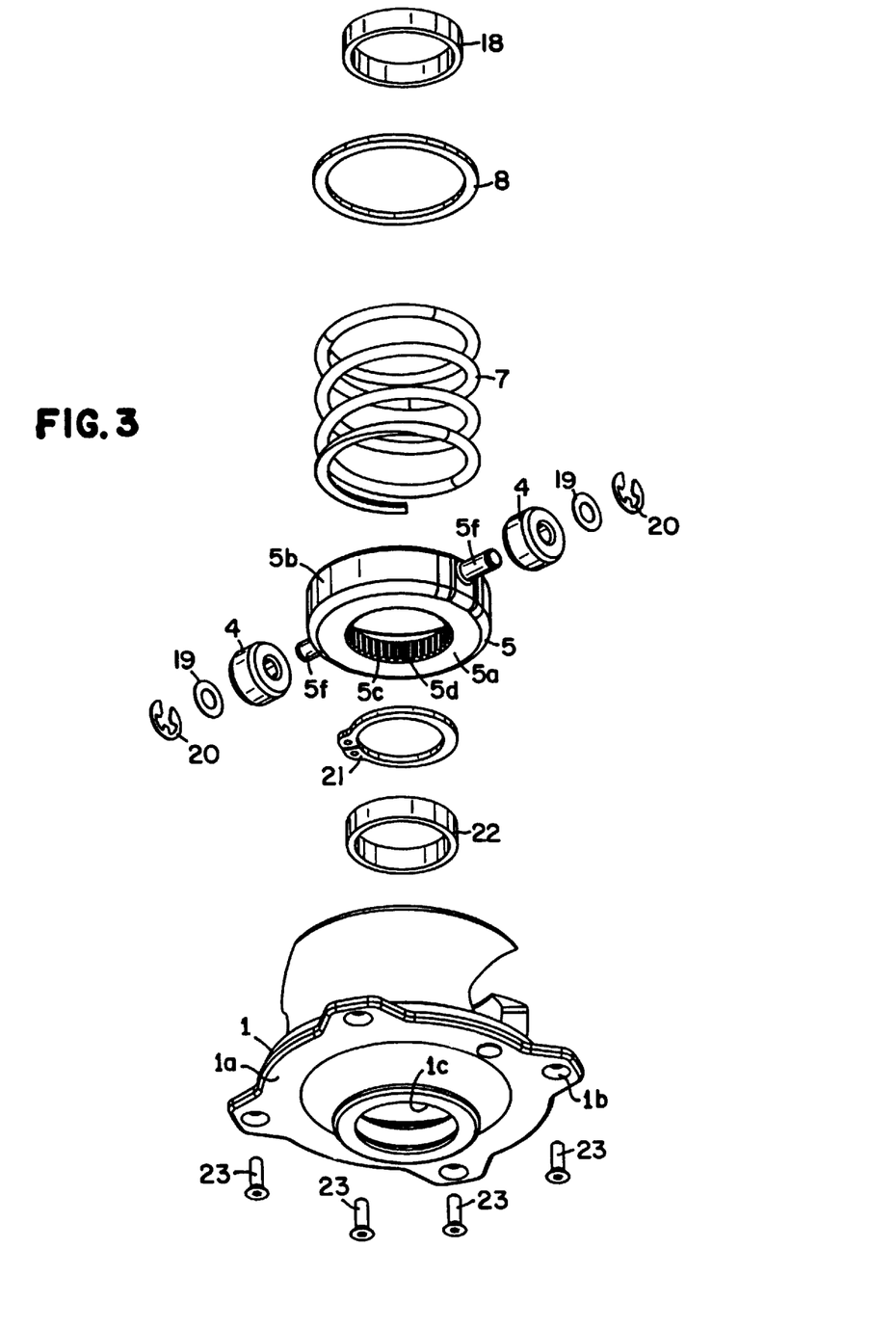
FIG. 3 is an enlarged exploded perspective of a portion of the invention shown in FIG. 1 as viewed from below.
Figure 4:
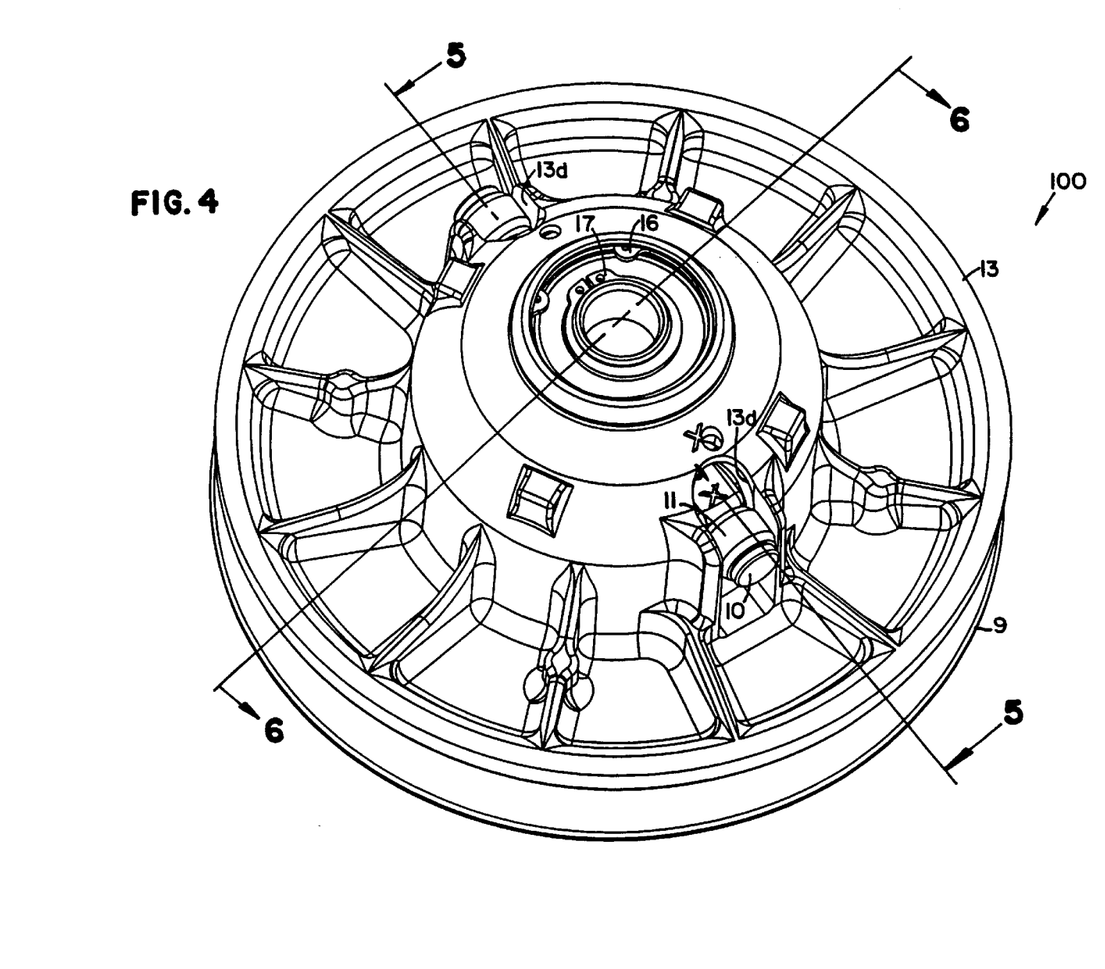
FIG. 4 is a top perspective view of the assembled driven clutch shown in FIG. 1.
Figure 5:
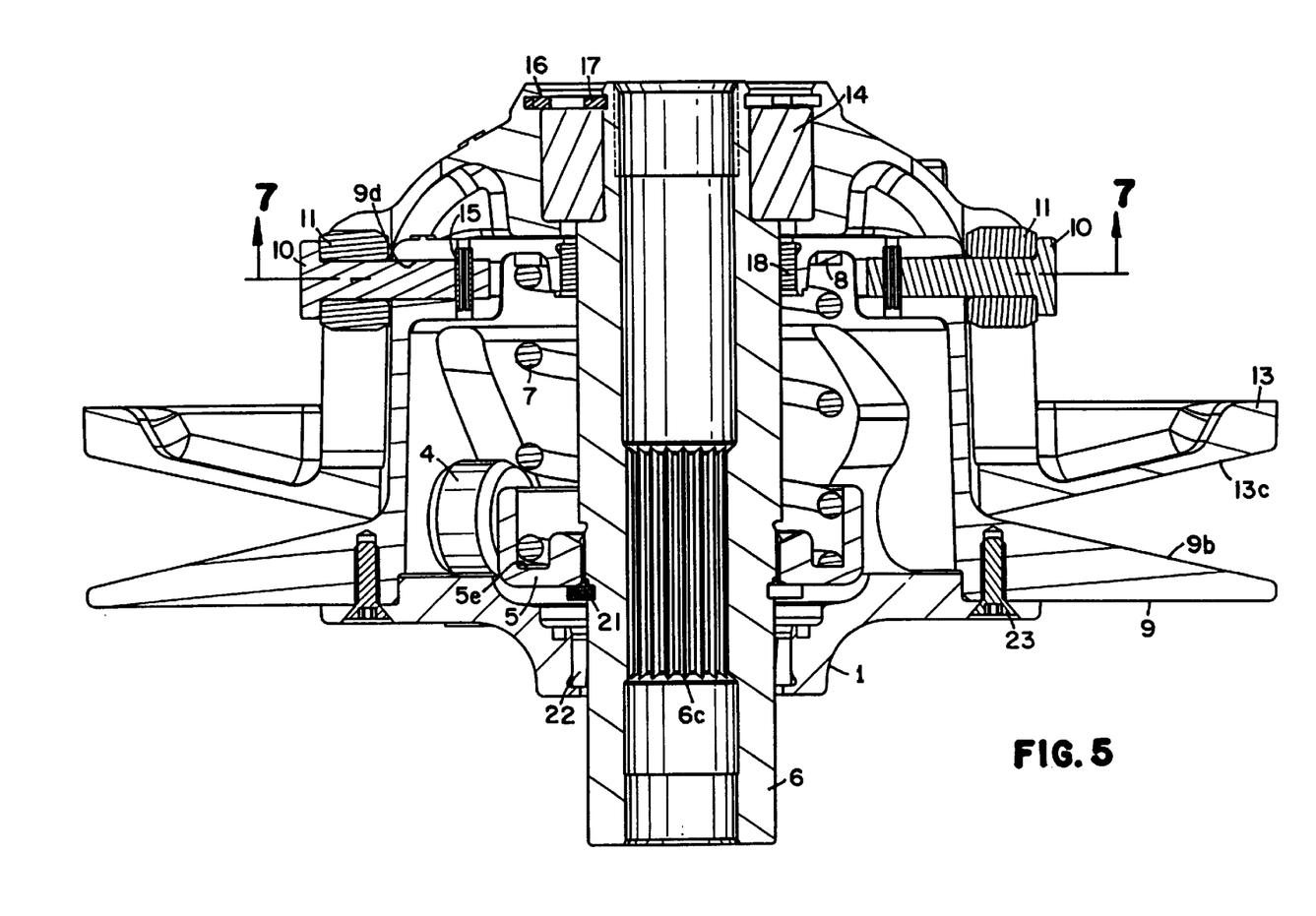
FIG. 5 is a cross-sectional view of the driven clutch shown in FIG. 4, taken generally along the lines 5—5.

A second, or moveable sheave 9, includes a generally cylindrical housing 9a and a conical-faced sheave portion 9b. The sheave portion 9b and housing 9a are preferably formed as an integral one-piece unit. The sheave portion 9b is a conically-faced belt contacting sheave portion which is coaxially mounted on the post 6 through an opening 9c. The second sheave 9 is rotatable on the post 6 and also may move longitudinally along the post 6 as will be described more fully hereafter. A bearing (or bushing) 18 is positioned in opening 9c and allows for rotating and translating on post 6. The housing 9a is sized and configured to be positioned inside of the housing 13a. As is well known in the art, an endless V-shaped belt connects the drive element to the driven clutch between the two conical-faced sheave elements. Openings 9d are formed in the housing 9a and are spaced 180 degrees. The openings 9d are longitudinal bores into the housing to receive the shaft of the pin 10. The openings 9d are in alignment with the slots 13d. As shown in FIG. 5, a roller 11 is positioned in each opening 9d and rotatably mounted on a pin 10. The portion of the housing 9a that is on top of the opening 9d has an aperture 9e formed therein. A pin 15 is inserted in the aperture 9e and goes through the pin 10 and into the housing 9a on the other side of the pin 10. This secures the pin 10 in the housing 9a. Other suitable methods may of course be utilized to rotatably mount the rollers 11. The assembled roller 11 and pin 10 is seen in FIG. 2. In assembling the clutch 100, the second sheave 9 is placed inside of the first sheave 13, as shown in the cross section views. Then the pin 10 and rollers 11 are assembled. Access openings 13e are formed in the housing 13a to provide access for a tool to insert the pins 15 into the housing 9a.

As can be seen in FIG. 6, a circular flange 9f is formed as a portion of the housing 9a and a bushing or bearing 18 is positioned inside of the flange 9f. A washer 8 is positioned on the outside of the flange 9f, as shown in FIG. 5. A compression spring 7 is positioned around the post 6 and has one end bearing on the washer 8 and the other end bearing on a spider 5. The spider 5 is generally ring shaped and has a planar surface 5a. A circular side member 5b is operatively connected to the planar surface 5a. An inner side member 5c is operatively connected to the planar member 5a and a plurality of vertical splines 5d are formed therein. A circular depression 5e is formed between the side members 5b and 5c. The other end of the spring 7 is positioned in the circular depression 5e. The spring initially holds the sheave portions together and the cam, as will be described more fully hereafter, is utilized to overcome the spring force and separate the sheave portions, thereby changing the effective diameter of the driven element. Two posts 5f are operatively connected to the spider 5 and extend generally outward and are spaced 180 degrees from each other. A roller 4 is rotatably mounted on the post 5f and secured by a washer 19 and snap ring 20. The splines 5d are in alignment with the splines 6a and secure the spider 5 to the post 6. It is understood that other suitable methods of connecting the spider to the post may be used such as a press fit, welding, use of Loctite™ or use of a key.

A cam 1 has a base plate 1a in which four screw openings 1b are formed. Screws 23 secure the cam 1 to the moveable sheave 9, as can be seen in FIG. 5. The cam 1 has a circular opening 1c for coaxially mounting the cam on the post 6. A bearing or bushing 22 is mounted in the opening 1c for rotatably mounting the cam 1 and the second sheave 9 around the post 6. As shown in FIG. 5, the snap ring 21 is positioned around the post 6 and prevents movement of the spider 5 past the snap ring 21. The cam housing 1d has a cam track that has a first cam surface 1e for positive torque and a second cam track 1f for negative torque. As can be seen, the cam surface 1f has a back angle which allows for the belt to be squeezed when engine braking is needed.

The present invention ties the first sheave 13 to the second sheave 9 by a pin 10 and roller 11. It is understood that other suitable methods may be utilized to secure the roller 11 to the housing 9. Similarly, it is also understood that where a roller 11 is utilized, one skilled in the art would also recognize that a button or sliding block or other methods may be used to similarly connect the two sheaves 9 and 13. Another example of how the two sheaves 9 and 13 could be tied together is a keyway type of arrangement between the sheaves 9 and 13. On one of the sheaves, it would have an open track, as with sheave 13. The other sheave would have a boss extending from its side that would fit into the open track and thereby tie the two sheaves together. Preferably, the open slot or track Would be on the moveable sheave and the boss on the inside of the housing of the stationary sheave. With the present invention, due to tying the two sheaves 9 and 13 together, the rotational movement between the two sheaves 9 and 13 is eliminated. This will minimize the smearing of the belt. By eliminating, or substantially reducing the relative motion between the sheaves 9 and 13, belt life is also increased and engine braking is also improved. To allow the continuously variable transmission to change ratio, a bearing 14 or bar roller (anything to keep the stationary sheave concentric to and perpendicular to the axis of the post 6) is used to allow rotational movement of the stationary sheave 13 about the post. This bearing is then fixed to the post 6. This can be done by a retainer ring or shoulders on the posts 6. This allows the stationary sheave 13 to rotate, but not translate along the post 6 and lets the moveable sheave 9 translate along the post 6 and rotate relative to the post 6. The present invention which ties the two sheaves 9 and 13 together and sends all of the torque of the secondary clutch through the cam. This makes the present design more torque sensitive. Being more torque sensitive also provides for more effective engine braking. This can be done by sending all of the torque of the machine through the cam giving more control over how the belt is squeezed. There is engine braking by having two angles on the cam 1. The first cam surface 1e is used when the engine is driving the vehicle. The other cam surface 1f is a reverse angle on the cam. When the vehicle is driving the engine during engine braking, the roller 4 goes to the other side of the cam and hits the reverse angle 1f. This provides the torque sensitivity required to squeeze the belt tight enough to couple the engine to the driving member and use the engine compression to decelerate the vehicle. With the present design, we can fine tune when the engine braking occurs by where we begin the reverse angle cut. By adjusting the cam profile to begin engine braking at 20 miles per hour if that is what the market wants or 40 miles per hour or whatever else is needed. By changing the cam profile, will also change the amount of engine braking.

As previously discussed, the present invention provides for the tying together of the two sheaves 9 and 13 so that there is no relative rotation between the sheaves. This is accomplished by the rollers 11 that fit inside of the slots 13d. Therefore, when the sheave 9 rotates, the sheave 13 similarly rotates. Both sheaves 9 and 13 are free to rotate around the post 6. Further, the sheave 9 is able to move up and down the post 6 axially. This is caused by rotation of the cam 1. As the cam 1 rotates, it moves longitudinally about the sliding member of the spider 5 that are in the cam track. Because the cam and the moveable sheave 9 are fastened together, this motion moves the moveable sheave 9 rotationally and longitudinally. This causes the sheave 9 to rotate as the two are tied together by screws 23. This spider 5, which is fixed with respect to the post 6 will move the moveable sheave 9 in and out as the spider moves along the cam surfaces of the cam 1.

The present invention provides for the tying of the two sheaves 9 and 13 so that there is no relative rotation between the sheaves. The invention has been described with respect to a specific clutch configuration. However, it is understood that this invention may be used with many other types of clutches, either more sophisticated or simpler in design. A simpler clutch could be built that would be built on to a cylindrical base member. The cylindrical base member could either be a post as previously described or it could be built directly on to a transmission shaft. The base member would have a cam track machined on to its outer diameter. The stationary sheave would be fixed to the base member so that it could rotate. The moveable sheave would have a pin in it that is positioned in the cam profile on the shaft. A compression spring is positioned between the moveable sheave and the shoulder on the snap ring of the shaft. Then a suitable connector, as previously described, or other similar connectors would be utilized to tie the moveable sheave together with the stationary sheave that would prevent the relative motion between the two sheaves.

The foregoing paragraph describes another method of connecting the post to the second sheave in addition to the description as shown in FIGS. 1 through 8 wherein a cam 1 and spider 5 arrangement is utilized. It is understood that other suitable methods could be utilized to make this first connection. The second connector utilized in the present invention is the connector previously described to tie the first and second sheaves together wherein the first and second sheaves rotate together to reduce belt smear.

Figure 9:
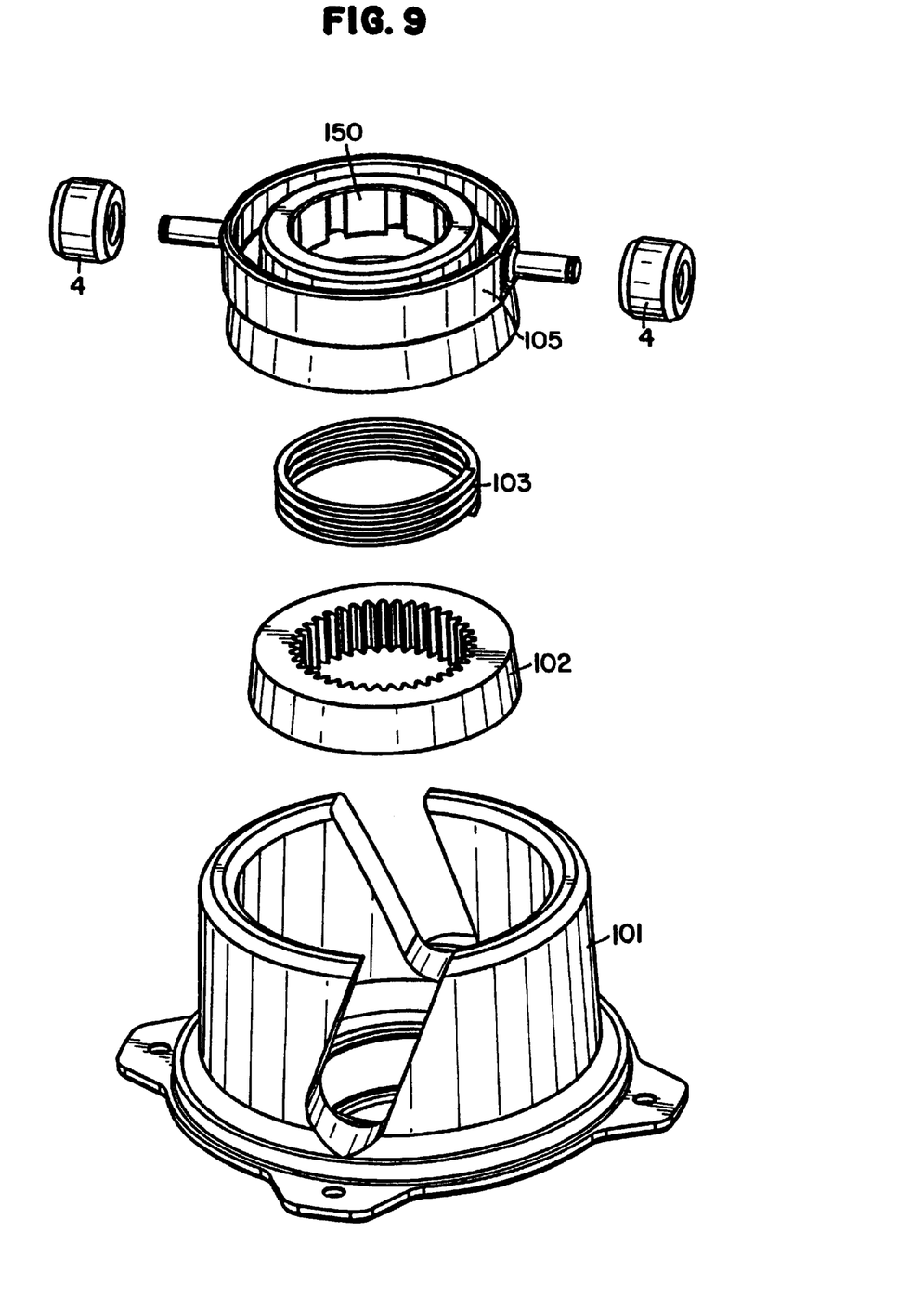
FIG. 9 is an exploded perspective of a second embodiment of the present invention.

A second embodiment of the present invention is shown in FIG. 9. Only those components which are different from that shown in the first embodiment are shown and it is only these different components that will be described, it being understood that the remainder of the components are similar to that shown in the first embodiment. The second embodiment is an engagement clutch mechanism that when engaged will deliver torque from the sheaves and belt through the spider and into the post. This mechanism can be a cone, plate or other clutch design. When this clutch is disengaged, no torque will be delivered through this mechanism. This part of the system uses the spider 105, disengagement spring 103, and a cone 102 that is locked to the post 6. The mechanism works in the following manner.

At idle, low ratio, the rollers 4 on the spider 105 contact the bottom of the cam track in the cam 101 which is bolted to the moveable sheave 9. When the rollers 4 bottom out in the cam 101, the force from the compression spring 7 is put into the moveable sheave and the cam. There is no force pushing the spider 105 into the cone 102 in this position. Because there is no force from the spring and sheaves, the disengagement spring 103 separates the cones and no torque is delivered.

Once the RPM of the engine starts going above idle, the CVT (continuously variable transmission) will begin to shift to a higher ratio. As this begins to shift, the moveable sheave 9 and cam 101 will move away from the stationary sheave 13. The rollers 4 will then move off the bottom of the cam 101 and begin to move up the cam track. As soon as the rollers begin moving up the cam profile, the compression spring 7 will push on the spider 105 with a certain force. The disengagement spring 103 will be less than the compression spring force. Because of this force difference, the compression spring 7 overcomes the disengagement spring 103 and pushes the spider 105 into the engagement mechanism 102 and torque is delivered to the post 6. Another important function of the disengagement spring 103 is to keep the sheaves 9 and 13 squeezing the belt tight.

This configuration will allow the belt to remain tight and keep the secondary portion of the CVT to be spinning all the time. One problem with the existing technology is that when at idle the primary clutch is not squeezing the belt tight enough to delivery power or spin the belt. During CVT engagement, the engine RPM increases and the primary portion of the CVT squeezes the belt with enough force to accelerate the system and move the vehicle. Once there is belt face force from the primary clutch, the vehicle will move. Up to this point however, the belt will slip. This is detrimental to the life of the belt. Our system will allow the engagement clutch, which is designed to slip, to do the slipping during engagement and save on belt life.

There are other systems in the market today that attempt to do something similar to the foregoing. One of these items is that people will put a starter, centrifugal clutch locking into a drum, on the crankshaft of an engine. When the engine gets to a high enough speed, the starter clutch will engage the crankshaft to the primary clutch and drive the vehicle. In this system, the belt part of the system is responsible only for ratio change and will always keep tight and the starter clutch does the engagement and overload slipping. One area that we feel the present invention is an improvement is that it is between the secondary clutch and the transmission or transaxle. This gives the benefit of having the slip torque set high enough to maximize the power to the ground. The other systems being on the engine are before the ratio reduction of the CVT. If there is a 30 foot-pound motor and a 3:1 CVT reduction, you get 90 foot-pounds into the transmission. The present invention could set the slip limit at 80 foot-pounds. In the other systems, if the slip feature is set at 10 foot-pounds below the rated torque, the slip torque would be 20 foot-pounds, you only get 60 foot-pounds to the transmission.

This system can be run either as a dry system or as a wet system where it would run in an oiled environment. Either way this could be run as seen in FIG. 9 or it could be packaged inside a transmission or transaxle.

Another feature of the second embodiment is a one-way clutch 150 housed in the spider 105. This clutch 105 can be used in two ways.

The first way a one-way clutch could be used is to use it as the primary torquecarrying member. It would engage when the operator is trying to put torque through the CVT. The torque goes through the cam 101 into the spider 105 and into the post 6. With the one-way, the torque goes through the cam into the spider, into the one way and into the post. When there is a back-driving situation, the final driving member overdrives the CVT system, the one-way clutch would disengage from the post 6 and would let the CVT free wheel. This is a feature that would work very well in snowmobiles. One example of this is when a rider locks up the brake for an instant then goes to wide-open throttle immediately. As soon as the brake is released, the track accelerates the jackshaft and secondary clutch driving the CVT into the wrong ratio. Because the CVT is in the wrong ratio, there can be an engine bog until the CVT shifts back to the correct ratio and the engine will then run at the optimum RPM. The one-way clutch 150 would keep the back driving torque from driving the CVT into the incorrect ratio. Therefore, throttle response and efficiency would be vastly improved.

One other benefit of a one-way clutch is a lower rate compression spring 7 could be used and you would still have the performance of a heavier spring. A heavy spring is currently needed to help with some of the problems mentioned in the above paragraph. With a one-way clutch, a lighter spring could be used resulting in a more efficient CVT.

Other designs that don't use a one-way clutch balance backshifting, up shifting, top end speed, and efficiency. To get good back shifting, the current designs need a very high force spring. Belt life will be shortened, fuel mileage is diminished, top end speed is lower and overall efficiency will drop. To get better top end speed, fuel mileage, belt life, and efficiency, you need to run with a spring with less force. When you do this, the CVT will not back shift as fast as it would with a spring with less force. With a one-way bearing in either a tied together or a non-tied together CVT we can run spring with lower overall force but still get good back shifting. In general, we want to minimize spring force required to get the vehicle moving. Any more spring force will lower the overall performance and efficiency of the machine except for back shifting which it will improve. To make the CVT work you need specific belt face forces. The higher the spring rate required to get the back shifting, the less torque sensing we can put through the cam.

Another use for a one-way clutch 150 is in engine braking. As mentioned with the cone 102 or plate clutch feature, the belt and secondary sheave will always be spinning. There are times such as going down a steep hill, when the engine will be at idle but engine braking is needed. The one-way clutch would engage when the engine is at idle, the cone or plate clutch is disengaged, and the post is trying to go faster than the spider (tires are going faster than the motor). When the one-way clutch engages, it would give engine braking to the tires during slow speed, engine at idle maneuvers.

The engine-braking concept would allow the user to use a standard primary clutch with a special secondary clutch. While at speed, the cone clutch mechanism will stay engaged and keep the belt tight thereby creating engine braking. During idle or when the CVT is in low gear and the cone clutch is disengaged, the one-way clutch will engage and keep the sheaves tight allowing engine braking.

The above specification, examples and data provide a complete description of the manufacture and use of the composition of the invention. Since many embodiments of the invention can be made without departing from the spirit and scope of the invention, the invention resides in the claims hereinafter appended.

We claim:
1. A torque-sensing clutch, comprising:
   a) a cylindrical base member;
   b) a first sheave operatively connected to the cylindrical base member, the first sheave rotatable on the cylindrical base member and being stationary relative to longitudinal movement on the cylindrical base member;
   c) a second sheave longitudinally moveable and rotatable on the cylindrical base member;
   d) a first connector operatively connecting the cylindrical base member to the second sheave for rotating the second sheave and for moving the second sheave longitudinally on the cylindrical base member; and
   e) a second connector operatively connecting the first and second sheaves, wherein the first and second sheaves rotate together the rotation of the second sheave causes rotation of the first sheave to rotate together without relative rotation as the second sheave moves longitudinally and reduces belt smear.

2. The clutch of claim 1, wherein the cylindrical base member is a post.

3. The clutch of claim 2, wherein the first connector is a cam and a spider.

4. The clutch of claim 3, wherein the second connector comprises:
   a) first and second longitudinal slots formed in the first sheave; and
   b) first and second rollers rotatably connected to the second sheave, the rollers positioned in the first and second slots respectively, wherein the slots and rollers rotationally tie together the first and second sheaves and the rollers permit longitudinal movement of the second sheave along the post.

5. A continuously variable transmission driven element for mounting on a rotatable shaft and adapted for use in a belt-type continuously variable transmission operatively connected by an endless belt to a drive element, the driven element comprising:
   a) a post adapted and configured to be operatively connected to a rotatable shaft;
   b) a housing operatively connected to the post, the housing rotatable on the post and being stationary relatively to longitudinal movement on the post;
   c) a first conical-faced belt contacting coaxially mounted sheave portion operatively connected to the housing;
   d) a second conical-faced belt contacting coaxially mounted sheave portion, the second sheave portion longitudinally movable and rotatable on the post;
   e) a connector operatively connecting the first and second sheave portions, wherein rotation of the second sheave portion causes rotation of the first sheave portion and reduces belt smear; and
   f) a cam, having a cam surface, operatively connected to the second sheave portion;
   g) a spider operatively connected to the post, the spider having a sliding member which is positioned on the cam surface, wherein rotation of the cam on the spider moves the second sheave portion longitudinally on the post; and h) a compression spring positioned between the spider and second sheave portion.

6. The driven element of claim 5, wherein the connector comprises:

a) first and second longitudinal slots formed in the housing; and b) first and second rollers rotatably connected to the second sheave portion, the rollers positioned in the first and second slots respectively, wherein the slots and rollers rotationally tie together the first and second sheaves and the rollers permit longitudinal movement of the second sheave portion along the post.

7. The driven element of claim 6, further comprising a plurality of first splines operatively to the post, the spider having an inner bore having a plurality of second splines operatively connected to the inner bore, wherein the spider is rotationally coupled to the post.

8. The driven element of claim 7, further comprising a first central opening formed in the housing, and a bearing mounted in the central opening, wherein the housing and first sheave portion is rotatable on the post.

9. The driven element of claim 8, further comprising the cam having a second central opening and a second bearing mounted therein, wherein the cam and second sheave are rotatable on the post.

10. A continuously variable transmission driven element for mounting on a rotatable shaft and adapted for use in a belt-type continuously variable transmission operatively connected by an endless belt to a drive element, the driven element comprising:

a) a post adapted and configured to be operatively connected to a rotatable shaft;

b) a housing operatively connected to the post, the housing rotatable on the post and being stationary relatively to longitudinal movement on the post;

c) a first conical-faced belt contacting coaxially mounted sheave portion operatively connected to the housing;

d) a second conical-faced belt contacting coaxially mounted sheave portion, the second sheave portion longitudinally movable and rotatable on the post;

e) means for connecting the first and second sheave portions, wherein rotation around the post by both sheave portions is equivalent, thereby reducing belt smear;

f) said connecting means providing for longitudinal movement of the second sheave portion on the post;

g) a cam, having a cam surface, operatively connected to the second sheave portion;

h) a spider operatively connected to the post, the spider having a sliding member which is positioned on the cam surface, wherein rotation of the cam on the spider moves the second sheave portion longitudinally on the post; and i) a compression spring positioned between the spider and second sheave portion.

11. The driven element of claim 10, wherein the connecting means comprises:

a) first and second longitudinal slots formed in the housing; and b) first and second rollers rotatably connected to the second sheave portion, the rollers positioned in the first and second slots respectively, wherein the slots and rollers rotationally tie together the first and second sheaves and the rollers permit longitudinal movement of the second sheave portion along the post.

12. The driven element of claim 11, further comprising a plurality of first splines operatively to the post, the spider having an inner bore having a plurality of second splines operatively connected to the inner bore, wherein the spider is rotationally coupled to the post.

13. The driven element of claim 12, further comprising a first central opening formed in the housing, and a bearing mounted in the central opening, wherein the housing and first sheave portion is rotatably on the post.

14. The driven element of claim 13, further comprising the cam having a second central opening and a second bearing mounted therein, wherein the cam and second sheave are rotatable on the post.

* * * * *